(12) United States Patent
Kumagai et al.

(10) Patent No.: US 9,249,322 B2
(45) Date of Patent: Feb. 2, 2016

(54) INK SET

(71) Applicant: Seiko Epson Corporation, Tokyo (JP)

(72) Inventors: Shiki Kumagai, Shiojiri (JP); Hiroki Nakane, Matsumoto (JP); Akira Mizutani, Shiojiri (JP)

(73) Assignee: Seiko Epson Corporation (JP)

( * ) Notice: Subject to any disclaimer, the term of this patent is extended or adjusted under 35 U.S.C. 154(b) by 11 days.

(21) Appl. No.: 14/153,499

(22) Filed: Jan. 13, 2014

(65) Prior Publication Data

US 2014/0210918 A1   Jul. 31, 2014

(30) Foreign Application Priority Data

Jan. 30, 2013   (JP) ................. 2013-015480

(51) Int. Cl.
*C09D 11/02* (2014.01)
*C09D 11/30* (2014.01)
*C09D 11/324* (2014.01)
*C09D 11/40* (2014.01)

(52) U.S. Cl.
CPC .............. *C09D 11/30* (2013.01); *C09D 11/324* (2013.01); *C09D 11/40* (2013.01)

(58) Field of Classification Search
CPC .............................. C09D 11/40; C09D 11/324
See application file for complete search history.

(56) References Cited

U.S. PATENT DOCUMENTS

| 6,726,758 | B2 | 4/2004 | Sano | |
|---|---|---|---|---|
| 2003/0056687 | A1* | 3/2003 | Sano | 106/31.6 |
| 2005/0171240 | A1* | 8/2005 | Bauer et al. | 523/160 |
| 2007/0120926 | A1* | 5/2007 | Doumaux et al. | 347/100 |

FOREIGN PATENT DOCUMENTS

| JP | 2002-201389 A | 7/2002 |
|---|---|---|
| JP | 2003-055592 A | 2/2003 |

* cited by examiner

*Primary Examiner* — Veronica F Faison
(74) *Attorney, Agent, or Firm* — Harness, Dickey & Pierce, P.L.C.

(57) ABSTRACT

The ink set includes a deep black ink containing a carbon black, and a pale black ink containing the carbon black with a lower content than the deep black ink. The deep black ink further contains a first colorant and a second colorant, and the pale black ink further contains the first colorant, but does substantially not contain the second colorant. The first and the second colorant are each selected from the group consisting of cyan colorants, magenta colorants, violet colorants, and green colorants.

10 Claims, 2 Drawing Sheets

INK SET

Priority is claimed under 35 U.S.C. §119 to Japanese Application No. 2013-015480 filed on Jan. 30, 2013, is hereby incorporated by reference in its entirety.

BACKGROUND

1. Technical Field

The present invention relates to an ink set.

2. Related Art

Figure 1:
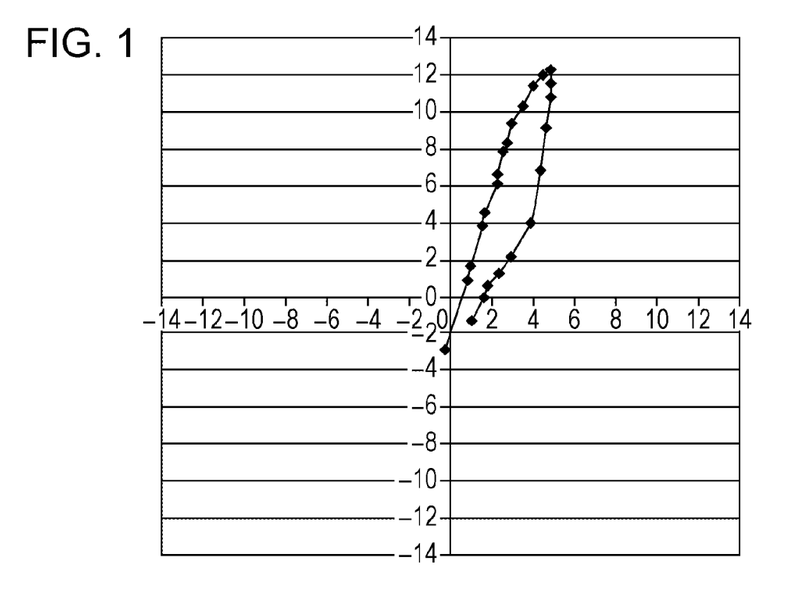
FIG. 1 is a plot of the hues of a gradation patch formed with a deep black ink Bk 3 containing only a carbon black as the colorant.

When achromatic gradation patches having a gradation from black to white are formed with a black ink containing only carbon black as the colorant, the hue of the gradation patch varies in such a manner that the a* and b* values turn away from the center (a* value=0, b* value=0) representing the genuine achromatic color, as shown in FIG. 1 illustrated in detail later. It is thus known that the color reproductivity of such an image is not satisfactory. One in this gradation patch, the hue lies at the center of the a*b* coordinates when the color is close to white. The color becomes slightly yellowish black as the amount of carbon black applied is increased, and when the carbon black is further applied to fill dots closely, the hue tends to return to the center of the a*b* coordinates. The term "color reproductivity" refers to a property of an ink representing small variation in hue for any color.

Ink sets have been proposed which are prevented from forming a slightly yellowish portion between colors in an achromatic image and thus achieve good color reproduction. For example, JP-A-2003-55592 discloses a black ink set including a plurality of black ink compositions, each containing a plurality of colorants: a carbon black, magenta pigment and cyan pigment. The carbon black contents are different among the black ink compositions, and the magenta pigment and cyan pigment contents in each black ink composition are adjusted so that the chroma C* of the ink composition is 3 or less.

The pale black ink, such as a gray ink, of the ink set disclosed in this patent document is prepared by adding very small amounts of two or more pigments. In such an ink composition, an error of the pigment content leads to a large variation in hue and causes variation among lots of the ink composition even if the error is very small. In addition, the color inconstancy (dependence on source light) of a black ink depends on the spectral characteristics of the carbon black in the black ink, that is, by the carbon black content in the black ink. Gray inks or other pale inks containing a carbon black with a low content have undesirable high color inconstancy.

SUMMARY

An advantage of some aspects of the invention is that it provides an ink set that can produce good color reproductivity (hereinafter may be referred to as "neutrality" in some cases) and low color inconstancy.

The present inventors have conducted intensive research to solve the above issues. As a result, it has been found that an ink set including a specific deep black ink and a specific pale black ink can solve the issues.

The ink set includes a deep black ink containing a carbon black, and a pale black ink containing the carbon black with a lower content than the deep black ink. The deep black ink further contains a first colorant and a second colorant, and the pale black ink further contains the first colorant, but does substantially not contain the second colorant. The first and the second colorant are each selected from the group consisting of cyan colorants, magenta colorants, violet colorants, and green colorants.

The first colorant may be cyan colorant.

The first colorant and the second material may be cyan colorant and magenta colorant, respectively. In this instance, the deep black ink contains 3% to 8% by mass of the carbon black, 0.5% to 4% by mass of the cyan colorant, and 0.5% to 4% by mass of the magenta colorant.

The pale black ink may contain the carbon black with a content of 3 to 10 times as high as the first colorant content in the pale black ink.

The carbon black content in the pale black ink may be less than 1.5% by mass.

The first colorant may be a phthalocyanine pigment and the second colorant may be a quinacridone pigment.

The pale black ink may have a color in the l*a*b* color space, and the absolute value of a* of the pale black ink is within 3.

In another aspect of the invention, a recording method is provided which includes recoding an image with the above-described ink set.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in detail with reference to the drawings as needed. However, the invention is not limited to the disclosed embodiments, and various modifications may be made without departing from the scope and spirit of the invention.

Ink Set

The ink set of an embodiment of the invention includes a deep black ink containing a carbon black, and a pale black ink containing a carbon black with a lower content than the deep black ink. The deep black ink further contains a first colorant and a second colorant, and the pale black ink further contains the first colorant, but does substantially not contain the second colorant. The first and the second colorant are each selected from the group consisting of cyan colorants, magenta colorants, violet colorants, and green colorants.

Deep Black Ink

The deep black ink contains a carbon black and a first and a second colorant other than the carbon black.

Carbon Black

Examples of the carbon black include, but are not limited to, No. 2300, No. 900, MCF 88, No. 33, No. 40, No. 45, No. 52, MA 7, MA 8, MA 100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by CABOT); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (each produced by Degussa).

First and Second Colorants

The first and the second colorant are selected from the group consisting of cyan, violet, magenta and green colorants. By using the first and second colorants, the tinge of color can be adjusted. Preferably, the first colorant is cyan colorant. When cyan colorant is used as the first colorant, the hue adjusted on a recording medium with the deep black ink and the pale black ink (described later) is likely to have an $a^*$ value of about 0 and lie along the $b^*$ axis. This means that the number of inks required for toning can be minimized. Thus, toning and preparation of a lookup table (LUT) can be easy. In addition, the toning can be easily performed without changing inks according to the amount of ink applied, unlike the ink shown in FIG. 1 whose hue changes in such a manner as to obliquely extend in the $a^*b^*$ space when the color is toned on a recording medium. Also, the pale black ink containing cyan colorant has a small different in hue from a toned color of the deep black ink and thus exhibits high neutrality. This is because the cyan colorant can tone a black color more effectively than magenta colorants or the like, which have similar hues to simple carbon blacks.

Preferably, the deep black ink contains 2% to 8% by mass of a carbon black, 0.5% to 4% by mass of cyan colorant as the first colorant, and 0.5% to 4% by mass of magenta colorant as the second colorant, and more preferably 3% to 5% by mass of a carbon black, 1.0% to 2.5% by mass of cyan colorant, and 1.0% to 2.5% by mass of magenta colorant, and still more preferably 3% to 5% by mass of a carbon black, 2% to 2.5% by mass of cyan colorant, and 2% to 2.5% by mass of magenta colorant. In such a deep black ink, the inherent tinge of the carbon black (particularly $a^*$ and $b^*$ values) is adjusted, and thus the neutrality of the deep black ink is further enhanced. Each of the colorant contents in the ink can be determined as below. The ink is diluted with water, and the spectral characteristics of the diluted solution of the ink are measured with an UV-Vis spectrophotometer. The peaks of the spectrum of the ink correspond to the colorants. The contents of the colorants in the ink can be calculated by comparing the spectrum of the ink with the spectra of the simple colorants.

In the deep black ink, the carbon black content is preferably higher than the total content of the first and second colorants. More specifically, the carbon black content is preferably 51% to 75% by mass, more preferably 51% to 70% by mass %, and still more preferably 51% to 65% by mass, relative to the total mass (100% by mass) of the colorants in the deep black ink. Such an ink exhibits a low color inconstancy.

Cyan Colorant

The cyan colorant can be appropriately selected from known dyes and pigments. Cyan colorants include, but are not limited to, C.I. Pigment Blues 1, 2, 3, 15, 15:1, 15:2, 15:3, 15:34, 15:4, 16, 18, 22, 25, 60, 65, and 66. Preferably, a phthalocyanine pigment is used as the first colorant. Examples of the phthalocyanine pigment include, but are not limited to, C.I. Pigment Blues 1, 2, 3, 15:3, 15:4, 15:34, 16, 22 and 60, and C.I. Vat Blues 4 and 60. These pigments may be used singly or in combination. The use of a phthalocyanine pigment helps form images having good color developability and weather fastness.

Magenta Colorant

The magenta colorant can be appropriately selected from known dyes and pigments. Examples of the magenta colorant include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, C.I. Pigment Violet 19, and solid solutions of these pigments. Preferably, a quinacridone pigment is used as the second colorant. Examples of the quinacridone pigment include, but are not limited to, C.I. Pigment Reds 5, 7, 12, 48(Ca), 48(Mn), 57(Ca), 15:1, 112, 122, 123, 168, 184, 202 and 209, C.I. Pigment Violet 19, and solid solutions of these pigments. These pigments may be used singly or in combination. The use of a quinacridone pigment helps form images having good color developability and weather fastness.

Violet Colorant

The violet colorant used as the first or second colorant can be appropriately selected from known dyes and pigments. Examples of the violet colorant include, but are not limited to, C.I. Pigment Violets 3, 23, 32, 33, 36, 38, 43, and 50. Pigment Violet 23 is preferred as the second colorant. The use of Pigment Violet 23 helps form images having good color developability and weather fastness. The above colorants may be used singly or in combination.

Green Colorant

The green colorant used as the first or second colorant can be appropriately selected from known dyes and pigments. Preferably, the green colorant is a phthalocyanine pigment, such as C.I. Pigment Greens 36 and 7. These pigments may be used singly or in combination. The use of phthalocyanine pigments helps form images having good color developability and weather fastness.

Pale Black Ink

The pale black ink contains a carbon black with a smaller content than the deep black ink and the first colorant, but does substantially not contain the second colorant. The use of the first colorant in the pale black ink means that the colorant is shared between the deep and pale black inks, and leads to reduced cost. When a plurality of colorants are used to compensate the color of the carbon black in a pale black ink, the content of each colorant is very small. It is difficult to control very small amounts of colorants, and this is a cause of variation among production lots of the ink. Accordingly, it is preferable that the pale black ink contain substantially no second colorant. The phrase "substantially not contain the second colorant" or "contain(s) substantially no second colorant" mentioned herein suggests that the second colorant may be contained to the extent that it does not function effectively. For example, the pale black ink may contain a trace amount of the second colorant, such as 0.1% by mass or less, 0.05% by mass or less, or 0.01% by mass or less, relative to the total mass (100% by mass) of the ink.

In the pale black ink, the carbon black content is preferably 3 to 10 times, more preferably 4 to 9 times, as high as the first colorant content of the pale black ink. A carbon black content in the above ranges leads to a further reduced color inconstancy. Also, when the carbon black content in the pale black ink is in the above ranges, the hue of a color adjusted on a recording medium with the pale black ink is likely to lie along the b* axis with an a* value of about 0. This suggests that the same color can be used for toning a color at any density. Thus, toning and preparation of a lookup table (LUT) can be easy. In addition, the toning can be easily performed without changing inks according to the amount of ink applied, unlike inks whose hue changes in such a manner as to obliquely extend in the a*b* space when the color is toned on a recording medium.

Figure 3:
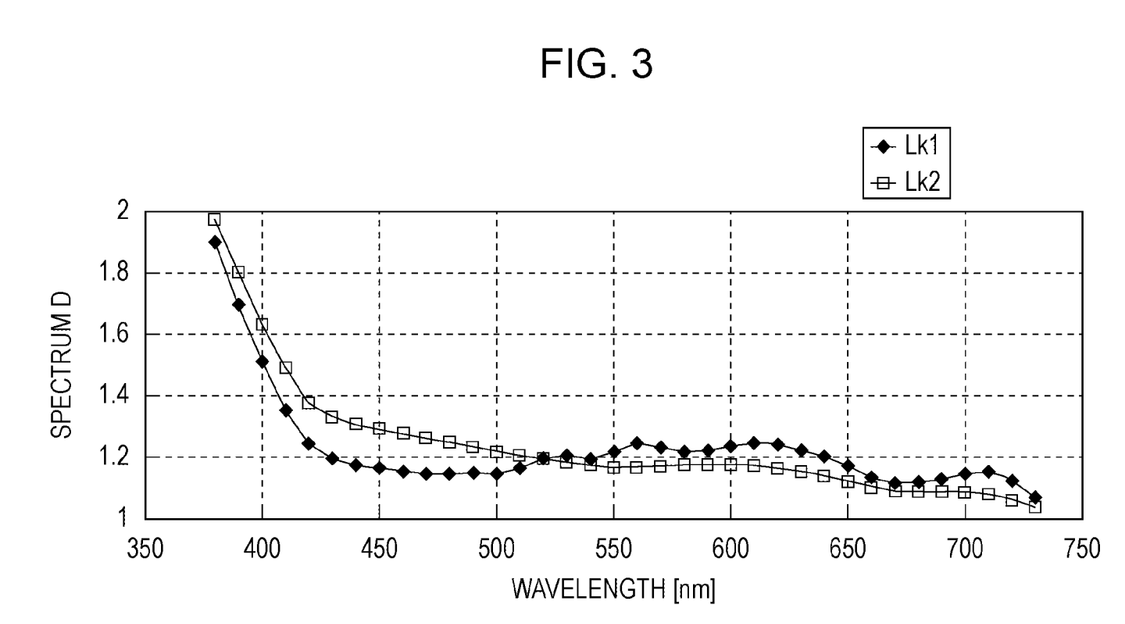
FIG. 3 is a plot showing color inconstancies of pale black inks Lk 1 and Lk 2.

FIG. 3 is a plot showing changes in the reflectance of light reflecting from pale black inks. The horizontal axis represents the wavelength of the light, and the vertical axis represents reflectance. As shown in FIG. 3, as the reflection spectrum has a gentler curve, that is, as the variation in reflectance with wavelength is smaller, color inconstancy decreases. By increasing the carbon black content, the ink can be controlled so as to have a gentle reflection spectrum. From the viewpoint of reducing color inconstancy, the first colorant is preferably cyan or magenta colorant. The gentleness of the curve of reflection spectra can be evaluated as will be described in Examples.

When the carbon black content in a pale black ink is so low that variation among lots of the ink is liable to occur, such as less than 1.5% by mass, less than 1.2% by mass, or less than 1.0% by mass, the pale black ink of the present embodiment is effective. When the recording medium is non-absorbent, the carbon black content in the pale black ink is preferably less than 1.2% by mass, more preferably less than 1% by mass, and still more preferably less than 0.6% by mass. Such a carbon black content leads to a composition that can form high-quality images on a non-absorbent medium.

The pale black ink has an absolute value |a*| of within 3, which represents the distance from the b* axis in the l*a*b* color space. Preferably, the distance |a*| is within 2, more preferably within 1. The distance |a*| is preferably as small as possible without particular limitation. When the distance from the b* axis in the l*a*b* color space is in the above range, the hue of the pale black ink lies along the b* axis. In this instance, it is easy to select an ink for color compensation. Consequently, toning on a recording medium or for preparing an LUT becomes easy, and satisfactory color gradation can be produced.

The deep and pale black inks of the present embodiment may further contain additives. Although additives that can be used in the inks will be described below, the additives are not limited to those disclosed below.

Dispersant

The deep and pale black inks of the present embodiment each may further contain a dispersant that will disperse the colorants in the solvent. A known dispersant used in conventional pigment dispersions may be used, such as a polymer dispersant or a surfactant.

The polymer dispersant may be, but is not limited to, a natural polymer or a synthetic polymer. Examples of the natural polymer include, but are not limited to, proteins, such as glue, gelatin, casein, and albumin; natural rubbers, such as gum arabic and gum traganth; glucosides, such as saponin; alginic acid and derivatives thereof such as propylene glycol alginate, triethanolamine alginate, and ammonium alginate; and cellulose derivatives, such as methyl cellulose, carboxymethyl cellulose, hydroxyethyl cellulose, and ethyl hydroxyethyl cellulose.

Examples of the synthetic polymer include, but are not limited to, polyvinyl alcohol; polyvinyl pyrrolidone; acrylic resins, such as polyacrylic acid, acrylic acid-acrylonitrile copolymer, potassium acrylate-acrylonitrile copolymer, vinyl acetate-acrylic ester copolymer, and acrylic acid-alkyl acrylic acrylate copolymer; styrene-acrylic resins, such as styrene-acrylic acid copolymer, styrene-methacrylic acid copolymer, styrene-methacrylic acid-alkyl acrylate copolymer, styrene-α-methylstyrene-acrylic acid copolymer, styrene-α-methylstyrene-acrylic acid-alkyl acrylate copolymer; styrene-maleic acid copolymer; styrene-maleic anhydride copolymer; vinyl naphthalene-acrylic acid copolymer; vinyl naphthalene-maleic acid copolymer; vinyl acetate-based copolymers, such as vinyl acetate-ethylene copolymer, vinyl acetate-vinyl ethylene fatty acid copolymer, vinyl acetate-maleic acid ester copolymer, vinyl acetate-crotonic acid copolymer, and vinyl acetate-acrylic acid copolymer; and salts of these polymers. Among these, preferred are copolymers of a monomer having a hydrophobic group and a monomer having a hydrophilic group, and homopolymers of a monomer having a hydrophobic group and a hydrophilic group. The salts of the polymers include those with diethyl amine, ammonia, ethylamine, triethylamine, propylamine, isopropylamine, dipropylamine, butylamine, isobutylamine, triethanolamine, diethanolamine, aminomethylpropanol, or morpholine. The polymer dispersant preferably has a weight average molecular weight of 3,000 to 30,000, more preferably 5,000 to 15,000.

Preferably, the polymer dispersant is a water-soluble acrylic acid-based resin. The water-soluble acrylic acid-based resin used herein is a resin containing acrylic acid as a component, and preferably acrylic acid is the main constituent of the resin.

Examples of the water-soluble acrylic acid-based resin include, but are not limited to, acrylic acid polymer, methacrylic acid polymer, acrylic acid-maleic acid copolymer, acrylic acid-methacrylic acid copolymer, acrylic acid-methacrylic acid-ethyl acrylate copolymer, acrylic acid-methacrylic acid-acrylonitrile copolymer, acrylic acid-n-butyl methacrylate copolymer, acrylic acid-methyl methacrylate copolymer, alkyl acrylate polymer, alkyl acrylate-acrylamide copolymer, alkyl acrylate-acrylic acid copolymer, alkyl acrylate-acrylic acid-alkylacrylamide copolymer, alkyl acrylate-acrylic acid-itaconic acid copolymer, alkyl acrylate-acrylic acid-alkyl itaconate copolymer, alkyl acrylate-acrylic acid-3-butene-2,3-tricarboxylic acid copolymer, alkyl acrylate-hydroxyalkyl acrylate copolymer, alkyl acrylate-itaconic acid copolymer, alkyl acrylate-ethylene glycol dimethacrylate copolymer, alkyl acrylate-chlorovinyl acetate copolymer, alkyl acrylate-diacetone acrylamide copolymer, alkyl acrylate-divinylbenzene copolymer, alkyl acrylate-vinyl pyridine copolymer, alkyl acrylate-alkyl maleate copolymer, alkyl acrylate-methacrylic acid copolymer, alkyl acrylate-methacrylic acid-diallyl phthalate copolymer, ethyl acrylate-methyl methacrylate-dimethylaminoethyl methacrylate copolymer, ethyl acrylate-glycidyl methacrylate-acrylamide-styrene copolymer, octyl acrylate-methyl methacrylate-triphenyl itaconate copolymer, octyl acrylate-methyl methacrylate-triphenyl methacrylate copolymer, octyl acrylate-methyl methacrylate-triphenyl maleate copolymer, tribromophenyl acrylate polymer, tribromophenyl acrylate-chlorostyrene copolymer, and salts of these polymers (for example, Li, Na, K, Ca, Mg, or Al salts). These resins may be used singly or in combination. These resins may be prepared by a conventional method. Also, commercially available resins may be used. If the water-soluble acrylic acid-based resin is a copolymer, it may be a block copolymer, a graft copolymer, a random copolymer, or a mixture of these forms, and the form of the copolymer is not particularly limited.

Examples of the surfactant that can be used as the dispersant include, but are not limited to, anionic surfactants, such as fatty acid salts, higher alkyldicarboxylic acid salts, fatty alcohol sulfate, higher alkylsulfonates, condensates of higher fatty acids and amino acids, sulfosuccinic acid esters, naphthenates, liquid fatty oil sulfates, and alkyl allyl sulfonates; cationic surfactants, such as fatty acid amine salts, quaternary ammonium salts, sulfonium salts, and phosphonium; nonionic surfactants, such as polyoxyethylene alkyl ethers, polyoxyethylene alkyl esters, sorbitan alkyl esters, and polyoxyethylene sorbitan alkyl esters. It will be appreciated by those skilled in the art that these surfactants used as the dispersant function as surfactants by being added to the deep and pale black inks. The dispersant content in the deep and pale black inks is preferably 0.01% to 10% by mass, and more preferably 0.05% to 5% by mass, relative to the total mass of the ink.

Water, Water-Soluble Organic Solvent

The deep and pale black inks each may contain water and a water-soluble organic solvent. The water may be pure water such as ion exchanged water, ultrafiltered water, reverse osmotic water, or distilled water, or ultrapure water.

The water-soluble organic solvent may be, but is not limited to, a low-boiling-point organic solvent or a high-boiling-point organic solvent. Examples of the low-boiling-point organic solvent include, but are not limited to, methanol, ethanol, n-propyl alcohol, isopropyl alcohol, n-butyl alcohol, sec-butyl alcohol, tert-butyl alcohol, isobutyl alcohol, and n-pentyl alcohol. In particular, monohydric alcohols are advantageously used. The low-boiling-point organic solvent content in the deep and pale black inks is preferably 1% to 30% by mass, more preferably 2% to 10% by mass, relative to the total mass of the ink.

Examples of the high-boiling-point organic solvent include, but are not limited to, polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; polyhydric alcohol alkyl ethers, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; and 2-pyrrolidone, N-methyl-2-pyrrolidone, 1,3-dimethyl-2-imidazolidinone, and triethanolamine.

Preferably, the water-soluble organic solvent has a boiling point of 180° C. or more. The use of a water-soluble organic solvent having a boiling point of 180° C. or more enhances the water retention and wettability of the deep and pale black inks. Consequently, the deep and pale black inks can be stably stored for a long time in a state where the aggregation of the colorants and the increase in viscosity are relatively reduced. In addition, the flowability and re-dispersibility of the deep and pale black inks can be maintained for a long time even if they are allowed to stand in an open state (in a state where the inks are in contact with air). In an ink jet recording method, clogging of nozzles, which is liable to occur during printing or when printing is restarted at an interval, can be suppressed, so that the inks can be stably ejected.

Examples of the water-soluble organic solvent having a boiling point of 180° C. or more include, but are not limited to, ethylene glycol (boiling point: 197° C., hereinafter parenthetic value refers to boiling point), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257 to 260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). More preferably, the water-soluble organic solvent has a boiling point of 200° C. or more. Water-soluble organic solvents may be used singly or in combination.

The high-boiling-point organic solvent content in the deep and pale black inks is preferably 1% to 30% by mass, more preferably 2% to 20% by mass, relative to the total mass of the ink.

Surfactant

The deep and pale black inks each may further contain a surfactant. Examples of the surfactant include, but are not limited to, anionic surfactants, such as sodium dodecylbenzenesulfonate, sodium laurate, and polyoxyethylenealkyl ether sulfate ammonium salt; nonionic surfactants, such as surfactant polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide; and amphoteric surfactants, such as N,N-dimethyl-N-alkyl-N-carboxymethyl ammonium betaine, N,N-dialkylaminoalkylene carboxylates, N,N,N-trialkyl-N-sulfoalkylene ammonium betaine, N,N-dialkyl-N,N-bis polyoxyethylene ammonium sulfate betaine, and 2-alkyl-1-carboxymethyl-1-hydroxy ethyl imidazolinium betaine. These surfactants may be used singly or in combination.

The deep and pale black inks each may further contain a glycol ether. The glycol ether may be used as the above-described water-soluble organic solvent. Examples of the glycol ethers include, but are not limited to, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol monoisopropyl ether. These glycol ethers may be used singly or in combination.

The deep and pale black inks each may further contain an acetylene glycol-based surfactant. The acetylene glycol-based surfactant in the deep and black inks can enhance the penetration of the ink into recording media, and thus reduces bleeding in the recording media. The acetylene glycol-based surfactant may be, but is not limited to, a compound expressed by the following general formula (I):

(I)

In the formula, m+n is in the range of 0 to 50, and $R^1$, $R^2$, $R^3$, and $R^4$ each represent an alkyl group, preferably, having a carbon number of 6 or less.

Preferred compounds expressed by general formula (I) include 2,4,7,9-tetramethyl-5-decyne-4,7-diol, 3,6-dimethyl-4-octyne-3,6-diol, and 3,5-dimethyl-1-hexyne-3-ol. Commercially available acetylene glycol-based surfactants expressed by general formula (I) may be used, such as Surfynol series 104, 82, 465 and 485 and TG (each produced by Air Products and Chemicals Inc.), and Olfine STG and Olfine E1010 (each produced by Nissin Chemical Industry). The surfactant content in the deep and pale black inks is preferably 0.01% to 10% by mass, and more preferably 0.1% to 5% by mass, relative to the total mass of the ink.

Other Constituents

The deep and pale black inks may further contain a tertiary amine, an alkali hydroxide, an alginic acid derivative, sugar, and a sugar derivative. These materials enhance the wettability, dispersion stability, and ejection stability of the deep and pale black inks.

Examples of the tertiary amine include, but are not limited to, trimethylamine, triethylamine, triethanolamine, dimethylethanolamine, diethylethanolamine, triisopropanolamine, and butyldiethanolamine. These compounds may be used singly or in combination. The tertiary amine content in the deep and pale black inks is preferably 0.01% to 10% by mass, and more preferably 0.1% to 5% by mass, relative to the total mass of the ink.

Examples of the alkali hydroxide include, but are not limited to, potassium hydroxide, sodium hydroxide, and lithium hydroxide. These compounds may be used singly or in combination. The alkali hydroxide content in the deep and pale black inks is preferably 0.01% to 5% by mass, and more preferably 0.05% to 3% by mass, relative to the total mass of the ink.

Examples of the alginic acid derivative include, but are not limited to, alkali metal alginates, such as sodium alginate and potassium alginate; triethanolamine alginate and other organic salts; and ammonium alginate. These compounds may be used singly or in combination. The alginic acid derivative content in the deep and pale black inks is preferably 0.001% to 5% by mass, and more preferably 0.01% to 3% by mass, relative to the total mass of the ink.

The sugar may be, but is not limited to, a monosaccharide, a disaccharide, an oligosaccharide (such as trisaccharide or tetrasaccharide), or a polysaccharide. Examples of the sugar include glucose, mannose, fructose, ribose, xylose, arabinose, galactose, aldonic acid, glucitol (sorbitol), maltose, cellobiose, lactose, sucrose, trehalose, and maltotriose. The term polysaccharide mentioned herein refers to saccharides in a broad sense including those present widely in nature, such as alginic acid, α-cyclodextrin, and cellulose. Examples of the sugar derivative include reduced sugars of the above-cited saccharides, such as sugar alcohols expressed by general formula $HOCH_2(CHOH)_nCH_2OH$ (n: integer of 2 to 5), oxidized sugars of the saccharides, such as aldonic acid and uronic acid, amino acids, and thio sugars. Sugar alcohols, such as maltitol and sorbitol, are advantageous. These compounds may be used singly or in combination. The content of the sugar or sugar derivative in the deep and pale black inks is preferably 0.1% to 20% by mass, and more preferably 1% to 10% by mass, relative to the total mass of the ink.

The deep and pale black inks each may further contain a preservative, a pH adjuster, a solubilizing agent, an antioxidant, a chelating agent, and other additives. Examples of the preservative include, but are not limited to, sodium benzoate, sodium pentachlorophenol, sodium-2-pyridine thiol-1-oxide, sodium sorbate, sodium dehydroacetate, and 1,2-dibenzisothiazolin-3-one (Proxel CRL, Proxel BDN, Proxel GXL, Proxel XL-2, and Proxel TN, each produced by Avecia). Examples of the pH adjuster, solubilizing agent or antioxidant include, but are not limited to, amines, such as diethanolamine, triethanolamine, propanolamine, and morpholine, and modified compounds of these amines; inorganic hydroxides, such as potassium hydroxide, sodium hydroxide, lithium hydroxide, and ammonium hydroxide; quaternary ammonium hydroxide, such as tetramethylammonium hydroxide; carbonates, such as potassium carbonate, sodium carbonate, and lithium carbonate; phosphates; urea compounds, such as N-methyl-2-pyrrolidone, urea, thiourea, and tetramethyl urea; allophanate compounds, such as allophanate and methyl allophanate; biuret compounds, such as biuret, dimethyl biuret, and tetramethyl biuret; and L-ascorbic acid and salts thereof. The chelating agent may be, but is not limited to, ethylenediaminetetraacetic acid (EDTA).

The ink set of an embodiment of the invention may be a color ink set including the above-described deep and pale black inks and any other ink composition. The ink composition other than the deep and pale black may be selected in view of the printing method. The color ink set may include the deep and pale black inks and a combination of magenta ink composition, cyan ink composition and a yellow ink composition or a combination of a light magenta ink composition, a light cyan ink composition and a light yellow ink composition. The magenta pigment and the cyan pigment used in the magenta ink composition or the cyan ink composition may be selected from those cited for the deep and pale black inks. Pigments that can be used in the yellow ink composition include C.I. Pigment Yellows 1, 2, 3, 12, 13, 14, 16, 17, 73, 74, 75, 83, 93, 95, 97, 98, 109, 110, 114, 128, 129, 138, 150, 151, 154, 155, 180, and 185. The cyan, magenta and yellow ink compositions may contain a dispersant, a water-soluble organic solvent, a surfactant and other additives. These additives may be the same as those used in the deep and pale black inks.

Preparation of Deep Black Ink, Pale Black Ink, and Other Ink Compositions

Each of the deep and pale black inks and other ink compositions can be prepared by mixing the above-described constituents in a suitable manner. For example, a pigment, a dispersant and water are mixed to prepare a uniform dispersion in or with a mixer such as a ball mill, a sand mill, an attritor, a roll mill, an agitator mill, a Henschel mixer, a colloid mill, an ultrasonic homogenizer, a jet mill, or an angmill. Then, the rest of the constituents, such as rest of water, a water-soluble organic solvent, and a surfactant, are further added to the dispersion, and mixed together to yield an ink liquid. After the ink liquid is sufficiently mixed, coarse particles and foreign matter are removed through a filter. Thus, a desired deep or pale black ink is prepared.

Recording Method

In a recording method according to an embodiment of the invention, an image is recorded with the ink set of the above embodiment. Achromatic images and color images can be formed by ejecting the inks of the ink while the recording density is being varied. Since the recording method of the embodiment uses the ink set of an embodiment of the invention, images can be recorded with good neutrality and low color inconstancy.

EXAMPLES

The invention will be further described in detail with reference to Examples and Comparative Examples. However, the invention is not limited to the following Examples.

Materials of Ink Compositions

The following compounds were major materials used in the ink compositions of the Examples and Comparative Examples.

Organic Solvent
  1,2-Hexanediol
  2-pyrrolidone
  Propylene glycol
Resin Emulsion
  Styrene-acrylic acid copolymer-based resin emulsion (Tg: 85° C., average particle size: 140 nm)
Polyethylene Wax
  AQUACER 515 (produced by BYK)
Silicone Surfactant
  BYK 348 (produced by BYK)
Acetylene Glycol-Based Antifoaming Agent
  Surfynol DF110D (HLB: 3, produced by Nissin Chemical Industry)
PH Adjuster
  Triethanolamine Preparation of Ink Compositions Deep black inks Bk 1 to Bk 3 and pale blacks Lk 1 to Lk 4 were prepared by mixing the above materials with the contents (percent by mass) shown in Table 1 and sufficiently stirring the mixture.

TABLE 1

| Type of constituent | Name of constituent | Content |
| --- | --- | --- |
| Pigment | See Table 2 | See Table 2 |
| Organic solvent | 1,2-Hexanediol | 5 |
|  | 2-Pyrrolidone | 15 |
|  | Propylene glycol | 10 |
| Resin | Resin emulsion | 1 |
|  | Polyethylene wax | 0.5 |
| Surfactant | Silicone surfactant | 0.5 |
| Antifoaming agent | Acetylene glycol surfactant | 0.2 |
| pH adjuster | Triethanolamine | 0.2 |
| Water | Pure water | Balance |
| Total |  | 100 |

TABLE 2

|  |  | Bk1 | Bk2 | Bk3 | Lk1 | Lk2 | Lk3 | Lk4 |
| --- | --- | --- | --- | --- | --- | --- | --- | --- |
| Colorant content | Bk (Carbon black) | 2.22 | 3.125 | 4 | 0.28 | 0.45 | 0.45 | 0.35 |
|  | C (Pigment Blue 15:3) | 0.89 | 1.25 | 0 | 0.11 | 0.05 | 0.00 | 0.15 |
|  | M (Pigment Red 122) | 0.89 | 0.625 | 0 | 0.11 | 0.00 | 0.05 | 0.00 |
| Colorant Proportion | Bk (Carbon black) | 5 | 5 | 1 | 5 | 9 | 9 | 7 |
|  | C (Pigment Blue 15:3) | 2 | 2 | 0 | 2 | 1 | 0 | 3 |
|  | M (Pigment Red 122) | 2 | 1 | 0 | 2 | 0 | 1 | 0 |

Ink Jet Recording Method (Examples and Comparative Examples)

An ink cartridge of an ink jet printer PX-G930 (manufactured by Seiko Epson) was charged with deep black inks Bk 1 to Bk 3 and pale black inks Lk 1 to Lk 4. Twenty patches having a gradation from black to white (with recording densities in increments of 5%) were formed on a recording medium (JT5829R manufactured by MACtac) by ejecting these inks by an ink jet method.

Measurements of $L^*$, $a^*$, and $b^*$

The hues ($L^*$, $a^*$ and $b^*$) of the gradation patches formed with deep black inks Bk 1 to Bk 3 and pale black inks Lk 1 to Lk 4 were measured at a field of view of 2° with a spectrophotometer Spectrolino (manufactured by GretagMacbeth) using a D50 light source. For the reference of white, the material (DIN 5033) supplied with the spectrometer was used. Table 3 shows the results at an $L^*$ of about 50.

TABLE 3

|  |  | Bk1 | Bk2 | Bk3 | Lk1 | Lk2 | Lk3 | Lk4 |
| --- | --- | --- | --- | --- | --- | --- | --- | --- |
| Reflectance | 700 nm | — | — | — | 1.114 | 1.084 | — | — |
|  | 550 nm | — | — | — | 1.215 | 1.167 | — | — |
|  | 430 nm | — | — | — | 1.191 | 1.329 | — | — |
| Hue | $L^*$ | 50 | 54.01 | 53.86 | 49.09 | 50.42 | 50.2 | 49.61 |
|  | $a^*$ | −2.13 | −1.82 | −0.45 | −6.35 | −0.45 | 11.47 | −13.59 |
|  | $b^*$ | −3.73 | −3.78 | −2.47 | −1.84 | 3.54 | −0.25 | −6.29 |

Valuation for Neutrality

The neutralities of deep black inks Bk 1 to Bk 3 and pale black inks Lk 1 to Lk 4 were evaluated based on the measurement results of the $a^*$ and $b^*$ values according to the following criteria, and the evaluation results of deep black inks Bk 1 to Bk 3 are shown in Table 4.

Figure 2:
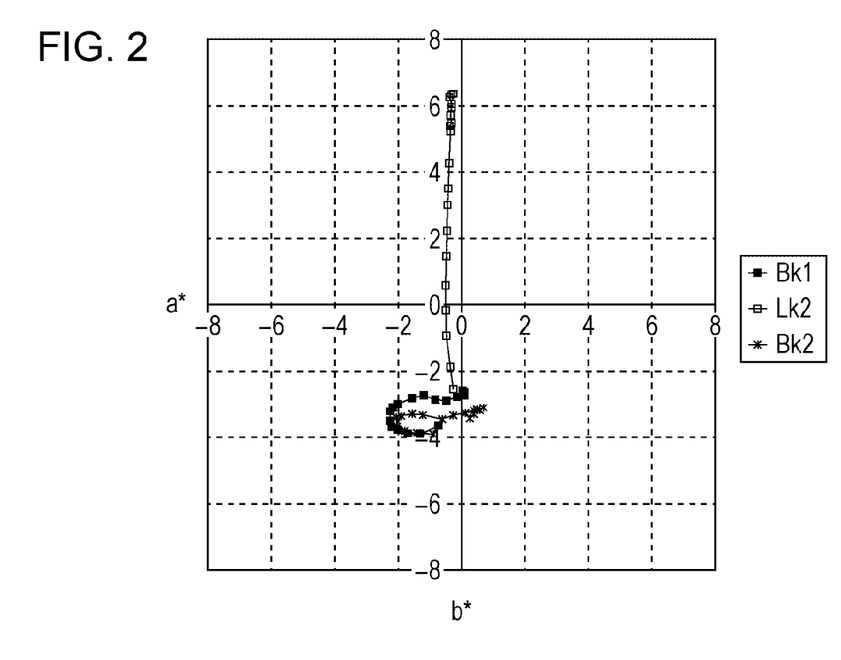
FIG. 2 is a plot showing changes in the hue of gradation patches each formed with any of deep black inks Bk 1 and Bk 2 and a pale black ink Lk 2.

Criteria
  A: Neutrality was very high as shown in FIG. 2.
  B: Neutrality is high as shown in FIG. 2, but is inferior to that of Bk 1.
  C: Evidently, neutrality is low as shown in FIG. 1.

TABLE 4

|  | Bk1 | Bk2 | Bk3 |
| --- | --- | --- | --- |
| Neutrality | A | B | C |

FIG. 1 shows the changes in the hue of the gradation patches of deep black ink Bk 3, and FIG. 2 shows the changes in the hues of the gradation patches of deep black inks Bk 1 and Bk 2 and pale black ink Lk 2.

Measurement of Color Inconstancy (CII)

The reflection spectra of the gradation patches of deep black inks Bk 1 to Bk 3 and pale black inks Lk 1 to Lk 4 were measured at various wavelengths using a spectrophotometer Spectrolino (manufactured by GretagMacbeth). The measurement was performed at a field of view of 2° with a D50 light source, and the wavelength was varied from 380 to 730 nm in increments of 10 nm. Table 5 shows the results of pale black inks Lk 1 and Lk 2.

Criteria

Good: The spectrum from 380 to 730 nm in increments of 10 nm has a gentle curve with no peak.

Bad: The spectrum from 380 to 730 nm in increments of 10 nm has peaks.

TABLE 5

|  | Lk1 | Lk2 |
|---|---|---|
| CII | Bad | Good |

The spectra of pale black inks Lk 1 and Lk 2 are shown in FIG. 3. When the spectrum has a gentle curve as black ink Lk 2 shows, the color of a sample can be constantly seen without depending on the light source, that is, the ink has low color inconstancy.

The decrease in the color inconstancy of an ink can be almost achieved by controlling the spectral characteristics of the ink, which depend mainly on the carbon black in the ink, that is, by controlling the carbon black content. From the viewpoint of reducing color inconstancy, therefore, the proportion of the carbon black to the other colorants in the pale black ink is desirably increased. Unfortunately, the increase in the carbon black content of the pale black ink results in a yellowish color, as in the case shown in FIG. 1. Therefore, it has been considered difficult to achieve both good neutrality and low color inconstancy. Also, it has been difficult in view of manufacture to add a plurality of pigments to a pale black ink. However, pale black inks Lk 2 and Lk 3 corresponding to an embodiment of the invention, when being used in combination with a deep black ink, can maintain the tone of gradation patches even though the carbon black content is relatively high, and accordingly can exhibit good color reproductivity. More specifically, while the hues of pale black ink Lk 2 varies along b* axis, unlike deep black ink Bk 1, as shown in FIG. 2, the ink set of Bk 1 and Lk 2 exhibited lower color inconstancy than the ink set of Bk 1 and Lk 1. Furthermore, although the neutrality of pale black ink Lk 1 was superior to that of each of pale black inks Lk 2 to Lk 4, these pale black inks exhibited the same color reproductivity when used in combination with deep black inks as ink sets because pale black inks have very low colorant contents. Although the total content of the colorants in each of pale black inks Lk 2 to Lk 4 was low, the number of colorants may be reduced to reduce the variation among lots of the ink set including these pale black inks. Thus, an ink set including any of pale black inks Lk 2 to Lk 4 was superior in view of general evaluation. As described above, ink sets including any of the pale black inks Lk 2 and Lk 3 of an embodiment of the invention can achieve both good neutrality and low color inconstancy. In pale black ink Lk 4, similarly, the carbon black had a predominance in the total content of the colorants, and accordingly, the color inconstancy was low. Also, by being used in combination with a deep black ink, good neutrality can be achieved.

Example 1

The ink cartridge of a printer PX-G930 was charged with inks Bk 1 and Lk 2. Solid pattern patches having a gradation from black to white were formed with each of the inks on a recording medium (JT5829R manufactured by MACtac) by an ink jet method.

Example 2

The ink cartridge of a printer PX-G930 was charged with inks Bk 1 and Lk 3. Solid pattern patches having a gradation from black to white were formed with each of the inks on a recording medium (JT5829R manufactured by MACtac) by an ink jet method.

Comparative Example 1

The ink cartridge of a printer PX-G930 was charged with inks Bk 3 and Lk 3. Solid pattern patches having a gradation from black to white were formed with each of the inks on a recording medium (JT5829R manufactured by MACtac) by an ink jet method.

Comparative Example 2

The ink cartridge of a printer PX-G930 was charged with inks Bk 2 and Lk 1. Solid pattern patches having a gradation from black to white were formed with each of the inks on a recording medium (JT5829R manufactured by MACtac) by an ink jet method.

Comparative Example 3

The ink cartridge of a printer PX-G930 was charged with inks Bk 3 and Lk 1. Solid pattern patches having a gradation from black to white were formed with each of the inks on a recording medium (JT5829R manufactured by MACtac) by an ink jet method.

Neutrality

In the ink sets of Examples 1 and 2, pale inks Lk 2 and Lk 3 were easily toned with deep black ink Bk 1, and thus the neutrality of the ink sets was satisfactory.

Color Inconstancy

Since Examples 1 and 2 each include pale black ink Lk 2 or Lk 3 having a higher carbon black content, the color inconstancy was reduced.

The ink set of an embodiment of the invention can be used for printing an achromatic image having a gradation from black to white.

What is claimed is:

1. An ink set comprising:
   a deep black ink containing a carbon black, a first colorant, and a second colorant; and
   a pale black ink containing the carbon black with a lower content than the deep black ink, the first colorant, and no second colorant,
   wherein the first and the second colorant are each selected from the group of cyan colorants and magenta colorants.

2. The ink set according to claim 1, wherein the first colorant is cyan colorant, and the second colorant is magenta colorant, and wherein the deep black ink contains 3% to 8% by mass of the carbon black, 0.5% to 4% by mass of the cyan colorant, and 0.5% to 4% by mass of the magenta colorant.

3. The ink set according to claim 1, wherein the pale black ink contains the carbon black with a content 3 to 10 times as high as the first colorant content in the pale black ink.

4. The ink set according to claim 1, wherein the carbon black content in the pale black ink is less than 1.5% by mass.

5. The ink set according to claim 1, wherein the pale black ink has a color in the l*a*b* color space, and the absolute value of a* of the pale black ink is within 3.

6. A recording method comprising recording an image with the ink set as set forth in claim 1.

7. A recording method comprising recording an image with the ink set as set forth in claim 2.

8. A recording method comprising recording an image with the ink set as set forth in claim 3.

9. A recording method comprising recording an image with the ink set as set forth in claim 4.

10. A recording method comprising recording an image with the ink set as set forth in claim 5.

* * * * *